Aug. 14, 1962

C. J. ARMOUR 3,049,659

SINGLE INPUT SERVO SYSTEM

Filed May 18, 1959

INVENTOR:
Charles J. Armour

Attorneys

United States Patent Office 3,049,659
Patented Aug. 14, 1962

3,049,659
SINGLE INPUT SERVO SYSTEM
Charles J. Armour, 14801 McCormick,
Sherman Oaks, Calif.
Filed May 18, 1959, Ser. No. 813,999
9 Claims. (Cl. 323—22)

This invention relates to a servo system and more particularly to a servo system having a sensitive and yet stable response.

In many types of systems, it is desired to regulate the operation of an output member so as to avoid variations in the response of the member. For example, it may be desired to regulate the positioning of a machine tool at any instant in accordance with signals introducted to the machine tool. In order to regulate the movements of the machine tool, it may be necessary to regulate the energizing voltage introduced to the various stages controlling the operation of the machine tool so that a constant potential is produced. By regulating the potential controlling the energizing of the different stages, the machine tool becomes responsive only to variations in the controlling voltage representing the desired positioning of the tool.

Various systems have been devised for providing a constant output voltage even with variations in the input voltage. These systems have not been entirely successful when it has been necessary to increase the voltage at certain times and to decrease the voltage at other times so as to maintain a constant voltage. These systems have not been entirely advantageous since they have required two separate amplifiers, one for obtaining an increase in voltage and the other for obtaining a decrease in voltage.

The use of two separate amplifiers has been disadvantageous since the characteristics of one of the amplifiers tends to drift at times relative to the characteristics of the other amplifier. Since the drift in the characteristics of the two amplifiers may be in opposite directions or in the same direction, the composite response of the two amplifiers becomes unpredictable. Another disadvantage results from the fact that the amplifiers are energized at all times, the amount of energizing being dependent upon the potential being produced at any instant. This is less desirable than energizing the amplifiers only when the control provided the amplifiers is needed.

This invention provides a servo system which regulates an output voltage while overcoming the difficulties described in the previous paragraph. The invention includes a single amplifier which controls both increases and decreases in the output voltage to maintain the output voltage at the desired level. First and second switching means are coupled to the single amplifier. Each of the switching means has two states of operation, one constituting an open state and the other constituting a closed state. For example, the switching means may be thyratrons which are normally biased to states of nonconductivity and which become conductive upon the introduction of a control voltage from the amplifier. One of the thyratrons becomes conductive when the output voltage increases above the desired value. When the thyratron becomes conductive, it energizes a control winding which actuates a servo member to obtain a decrease in the output voltage to the desired value. Similarly, the other thyratron becomes conductive upon a drop in the output voltage below the desired value and actuates the servo member to increase the output voltage to the desired value.

Other advantages of the invention will become apparent from a detailed description of the invention and from the enclosed drawings in which.

Figure 1:
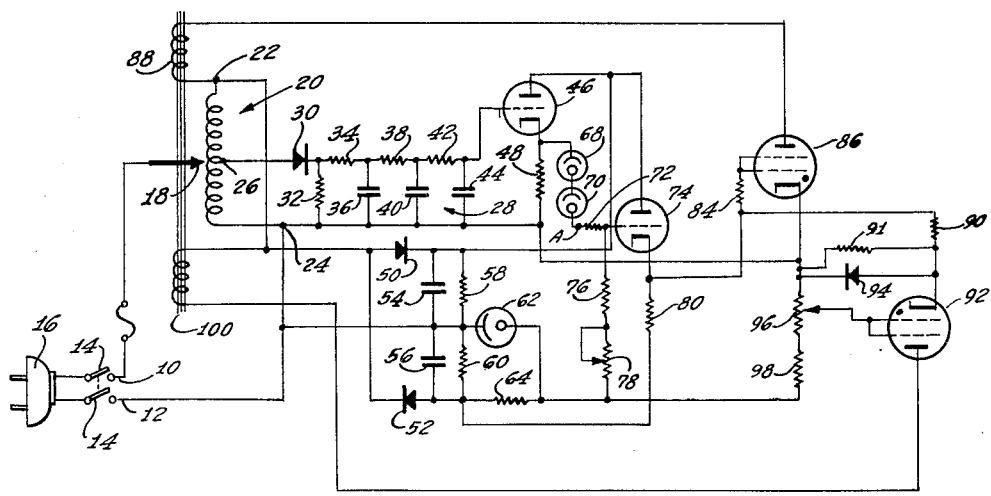
FIGURE 1 is a circuit diagram of one embodiment of the invention.

This embodiment includes a pair of lines 10 and 12 which are connected to ganged switches 14 to receive an alternating voltage through a plug 16 from a power outlet (not shown). The plug 16 may be inserted into a wall socket (not shown) to receive the alternating voltage introduced into a house or factory. As will become apparent, the voltage introduced to the wall socket may vary considerably at different times in accordance with requirements imposed on a power plant by industrial and home users. For example, industrial users have heavy demands during the day and home owners have heavy requirements at night.

The line 10 is connected to a movable arm 18 in an auto-transformer generally indicated at 20. The auto-transformer has two end terminals 22 and 24 and a center tap 26, the end terminal 24 being connected to the line 12. A rectifier and filter generally indicated at 28 is connected between the end terminal 24 and the center tap 26 of the auto-transformer 20 to rectify and smooth the alternating voltage introduced between these terminals.

The rectifier and filter 28 includes a diode 30 having its anode connected to the center tap 26 and its cathode connected to one terminal of a resistance 32, the other terminal of which has a common connection with the end terminal 24 of the auto-transformer 20. A resistance 34 and a capacitance 36 are in series across the resistance 32. Similarly, a resistance 38 and a capacitance 40 are in series across the capacitance 36, and a resistance 42 and a capacitance 44 are in series across the capacitance 40.

The potential produced on the terminal common to the resistance 42 and the capacitance 44 is introduced to the grid of a vacuum tube 46 which is connected in a cathode follower stage with a resistance 48. The resistance 48 is connected between the cathode of the tube 46 and the end terminal 24 of the auto-transformer 20.

The plate of the tube 46 is connected to receive a positive potential from the cathode of a diode 50, the plate of which has a common connection with the end terminal 22 of the auto-transformer 20. The end terminal 22 of the auto-transformer 20 is also connected to the cathode of a diode 52. A pair of capacitances 54 and 56 are in series between the cathode of the diode 50 and the anode of the diode 52, and a pair of resistances 58 and 60 are in series across the capacitances 54 and 56. The common terminals between the capacitances 54 and 56 and between the resistances 58 and 60 are connected to the end terminal 24 of the auto-transformer 20. A voltage-regulating tube 62 and a resistance 64 are in series across the resistance 60.

A pair of neon tubes 68 and 70 and a resistance 72 are in series between the cathode of the tube 46 and the grid of a vacuum tube 74. The grid of the tube 74 is biased through a resistance 76 and a rheostat 78 from the terminal common to the resistance 64 and the voltage-regulating tube 62. A resistance 80 is connected between the cathode of the tube 74 and the anode of the diode 52 such that the tube 74 and the resistance 80 operate as a cathode follower stage. The plate of the tube 74 is connected to the cathode of the diode 50 to receive a positive potential.

The potential on the cathode of the tube 74 is introduced through a resistance 84 to the control grid and suppressor grid of switching means such as gas-filled means, which may be a thyratron tube 86. The cathode of the thyratron tube 86 is connected to the end terminal 24 of the auto-transformer 20. The plate of the thyratron tube 86 is connected to one terminal of a control winding 88, the other terminal of which has a common connection with the end terminal 22 of the auto-transformer 20. The control winding 88 is magnetically coupled to the movable arm 18 in the auto-transformer 20 so as to actuate the arm in an upward direction in FIGURE 1.

The potential on the cathode of the tube 74 is also introduced through a resistance 90 to the cathode of a thyratron tube 92 which may also serve as switching means. A resistance 91 is connected between the cathode of the thyratron tube 92 and the end terminal 24 of the auto-transformer 20. The anode of a diode 94 has a common terminal with the cathode of the thyratron tube 92, and the cathode of the diode has a common connection with the end terminal 24 of the auto-transformer 20.

The control grid and suppressor grid of the thyratron tube 92 are biased from the movable arm of a potentiometer 96, which is included in a series circuit with a resistance 98 between the end terminal 24 of the auto-transformer 20 and the terminal common to the resistance 64 and the voltage-regulating tube 62. The plate of the tube 92 is connected to one terminal of a control winding 100, the other terminal of which has a common connection with the end terminal 22 of the auto-transformer 20. The control winding 100 is magnetically coupled to the movable arm 18 of the auto-transformer 20 so as to drive the movable arm downwardly in FIGURE 1 when the control winding becomes energized.

An alternating potential is introduced from the plug 16 to the auto-transformer 20 between the movable arm 18 and the end terminal 24 of the auto-transformer. This potential is changed by a proportionate amount dependent upon the positioning of the movable arm 18 along the winding of the auto-transformer. In this way, a potential is produced between the center tap 26 and the end terminal 24 of the auto-transformer in accordance with the potential across the lines 10 and 12 and in accordance with the setting of the movable arm of the auto-transformer.

The potential between the center tap 26 and the end terminal 24 of the auto-transformer 20 is rectified by the diode 30 and the rectified voltage 30 is smoothed by the filter including the resistances 32, 34, 38 and 42 and the capacitances 36, 40 and 44. In this way, a direct voltage proportionate to the alternating voltage between the centre tap 26 and the end terminal 24 of the auto-transformer 20 is introduced to the grid of the tube 46.

The tube 46 is included with the resistance 48 in a cathode follower stage such that the potential produced on the cathode of the tube 46 follows the potential on the grid of the tube. The cathode follower stage also operates to reduce the impedance at the cathode of the tube 46 relative to the impedance at the grid of the tube. By providing the cathode follower including the tube 46 and the cathode 48, the potential at the cathode of the tube 46 becomes isolated from the rectifier and filter 28. The potential at the cathode of the tube 46 is reduced a proportionate amount by the action of the neon tubes 68 and 70 and the resistance 72, and the reduced voltage is introduced to the grid of the tube 74, which is included with the resistance 80 in a cathode follower stage.

In alternate half cycles, the potential on the terminal 22 of the auto-transformer 20 is positive relative to the potential on the terminal 24 of the auto-transformer. This causes current to flow through a circuit including the end terminal 22, the diode 50, the capacitance 54, the end terminal 24 and the winding of the auto-transformer 20. Because of this flow of current, the capacitance 54 becomes charged to a potential in which the upper terminal of the capacitance 54 in FIGURE 1 is positive relative to the lower terminal of the capacitance.

In the other half cycles of the alternating voltage, the potential on the terminal 24 of the auto-transformer 20 is more positive than the potential on the terminal 22 such that current flows through a circuit including the end terminal 24, the capacitance 56, the diode 52, the end terminal 22 and the winding of the auto-transformer 20. This current charges the capacitance 56 in a direction to produce a positive potential on the upper terminal of the capacitance relative to the potential on the lower terminal of the capacitance.

In this way, the diodes 50 and 52 and the capacitances 54 and 56 operate as a voltage doubler in which a positive potential is produced on the cathode of the diode 50 and a negative potential is produced on the anode of the diode 52. The direct potential produced between the cathode of the diode 50 and anode of the diode 52 is regulated by the action of the voltage-regulating tube 62 so that a substantially constant potential is produced on the anode of the diode 52.

The grid of the thyratron tube 86 is negatively biased relative to the cathode of the tube so that the tube 86 is normally non-conductive. This corresponds to an open state of the switching means represented by the tube 86. Similarly, the grid of the thyratron tube 92 is negatively biased relative to the cathode of the tube to make the tube normally non-conductive. The non-conductivity of the tubes 86 and 92 is controlled by the signal introduced to the grid of the tube 86 and to the cathode of the tube 92 from the cathode of the tube 74 and the cathode follower stage. The resistance 80 in the cathode follower stage is connected to the anode of the diode 52 so that the potential at the cathode of the tube 74 can vary between a voltage in positive and negative directions from zero volts.

Because of the bias introduced to the cathode of the thyratron tube 86, the tube 86 becomes conductive when a positive potential greater than approximately +¼ volt is introduced to the grid of the tube 86 from the cathode of the tube 74. When the tube 86 becomes conductive, current flows through a circuit including the control winding 88, the tube 86, the terminal 24 of the auto-transformer 20, the winding of the auto-transformer and the terminal 22 of the auto-transformer. Current flows through the tube 86 only in the half cycles in which the potential on the terminal 22 of the auto-transformer 20 is positive relative to the potential on the terminal 24 of the auto transformer. In this way, the thyratron tube 86 becomes extinguished in alternating half cycles. By extinguishing the thyratron tube 86 in alternate half cycles, the tube can become conductive in the following half cycles only upon the introduction of a positive potential from the cathode of the tube 74.

When the tube 86 becomes conductive in alternate half cycles to produce a flow of current through the winding 88, the winding 88 produces a magnetic flux which acts upon the movable arm 18 of the auto-transformer 20 to drive the movable arm upwardly in FIGURE 1. Since the movable arm 18 moves upwardly in FIGURE 1, the potential produced between the center tap 26 and the end terminal 24 of the auto-transformer 20 becomes decreased. This causes the potential at the cathode of the tube 74 to become correspondingly decreased until the tube 86 no longer becomes conductive in the alternate half cycles.

In this way, the potential across the capacitance 44 decreases to a desired value at any time when the potential previously produced in the capacitance has increased above the desired value. The potential across the capacitance 44 is regulated to compensate for any variations in the input potential introduced across the lines 10 and 12 and to compensate for variations in the load introduced to the filter including the capacitance 44.

Upon a decrease in the potential on the cathode of the tube 74 to a negative value, the potential on the cathode of the thyratron tube 92 decreases below the potential on the grid of the tube. This causes the tube 92 to become conductive such that current flows through a circuit including the end terminal 22 of the auto-transformer 20, the control winding 100, the thyratron tube 92, the diode 94 and the winding of the auto-transformer. This current energizes the control winding 100, which in turn actuates the movable arm 18 of the auto-transformer 20 in a downward direction in FIGURE 1. This causes the potential on the center tap 26 of the auto-transformer 20 to increase until the potential on the cathode of the tube 74 rises to a value of approximately zero volts.

As will be seen from the above discussion, the tubes 86 and 92 are both normally non-conductive and become conductive in accordance with the operation of the same amplifier stages including the tube 74. Since the same amplifier stages control the operation of the tubes 86 and 92, stability in the operation of the servo system is obtained even with changes in the characteristics of the amplifier stages including the tube 74. Such changes in the operating characteristics of the amplifier stages may result from various factors including changes in ambient temperature and changes in the response characteristics in the vacuum tubes of these stages with continued uses of the vacuum tubes.

Figure 2:
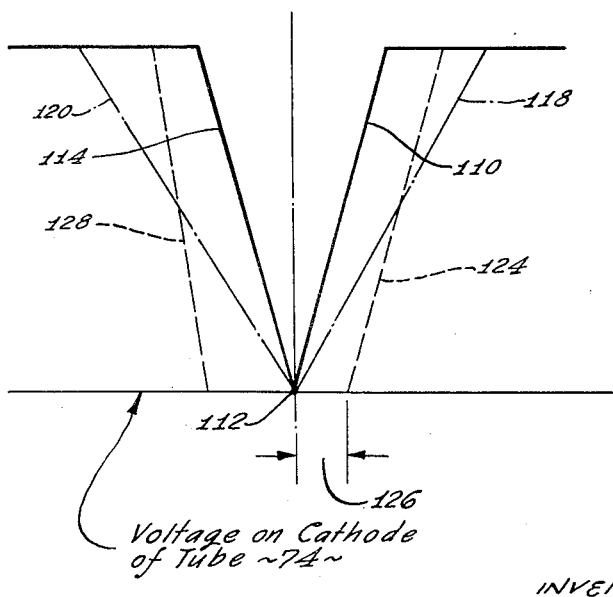
FIGURE 2 shows curves illustrating the operation of the circuitry shown in FIGURE 1 and comparing the operation of this circuitry with circuitry previously used to solve similar problems.

As will be seen from FIGURE 2, the stages including the vacuum tube 74 and the thyratron tube 86 may have response characteristics indicated by the curve 110 in FIGURE 2. The abscissa of the curve in FIGURE 2 represents positive variations in the voltage on the cathode of the tube 74 from a zero potential, such zero potential being indicated at 112 in FIGURE 2. The ordinate of the curve 110 in FIGURE 2 represents the absolute magnitude of the force which is exerted on the movable arm 18 by the control winding 88 to drive the movable arm to the proper position for obtaining the desired output voltage.

In like manner, a curve 114 represents the operation of the stages including the vaccum tube 74 and the thyratron tube 92 in driving the movable arm 18 in a direction to increase the potential across the capacitance 44 when the potential on the cathode of the tube 74 becomes negative. As will be seen, the curves 110 and 114 are symmetrical about the null point 112. This results in part from the fact that the amplifier stages including the tube 74 are coupled to both the thyratron tube 86 and the thyratron tube 92. It also results from the fact that the thyratron tubes 86 and 92 have similar characteristics. The thyratron tubes 86 and 92 have similar characteristics since they operate as switches which are either opened or closed.

Changes in the operating characteristics of the amplifier stages including the tube 74 may cause the operating characteristics of the force exerted on the movable arm 18 to vary respectively from the curves 110 and 114 in FIGURE 2 to such characteristics as the curves 118 and 120 in FIGURE 2. As will be seen, the curves 118 and 120 are symmetrical with the curves 114 and 116 and have the same null point 112 as the curves 110 and 114. Since the curves 118 and 120 are symmetrical about the same null point 112, the servo system shown in FIGURE 1 cannot become unstable even with changes in the operating characteristics of the amplifier stages including the vacuum tube 74.

The advantages of the servo system shown in FIGURE 1 become especially apparent when comparison is made with the operating characteristics of the servo systems previously used to accomplish similar purposes. In such previous servo systems, two separate amplifier inputs have been used, one to drive the movable arm 18 in an upward direction in FIGURE 1 and the other to drive the movable arm 18 in FIGURE 2 in a downward direction in FIGURE 1.

Since two separate amplifier inputs are used, one of the amplifiers may drift relative to the other. For example, one of the amplifiers may drift to cause its response characteristics to change from the curve 110 to a curve 124 in FIGURE 2. Because of this drifting, the null region now extends from the single point 112 to an extended region 126. This region may become even more extended if the response characteristics of the other amplifier should drift from that indicated by the curve 114 to that indicated by a curve 128. As will be seen from a comparison of the curves 124 and 128, further complications result from the fact that the curves 124 and 128 may no longer be symmetrical about the null point 112. Because of such drifts in the response characteristics of one amplifier relative to the other in the previous servo systems, instability in the operation of the previous servo systems has resulted.

The servo system constituting this invention has further advantages. One advantage, of course, results from the savings in the number of stages required since only one amplifier input is used rather than two amplifier inputs as in the previous servo systems. Another advantage results from the on-off characteristics of the switching means represented by the thyratrons 86 and 92. The on-off characteristics result from the fact that the thyratrons are normally non-conductive but become conductive when the output potential varies from the desired value. By providing on-off characteristics in the switching means, a sensitive and stable control over the positioning of the movable arm 18 in the auto-transformer 20 is obtained. This results from the fact that the thyratron tubes 86 and 92 do not have variations in characteristics which would respectively affect the response of the control windings 86 and 92.

The response of the thyratron tubes 86 and 92 in the null region 112 can be controlled by adjusting the biases applied to the thyratron tubes. For example, an adjustment in the bias of the tube 92 can be obtained by varying the positioning of the movable arm in the potentiometer 96. By adjusting the response of the thyratron tubes 86 and 92 in the null region, both of the tubes can be maintained in a state of non-conductivity in this region.

As an alternative, both of the tubes 86 and 92 may be maintained in a state of conductivity in the null region 112. When both tubes are maintained in states of conductivity, the force exerted by the control winding 88 on the movable arm 18 tends to counteract the force exerted by the control winding 100 on the movable arm 18. Since the forces exerted on the movable arm 18 in opposite directions are counter-balanced, the simultaneous production of states of conductivity in the tubes 86 and 92 in the null region is equivalent to maintaining both of the tubes in the non-conductive state in this region.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination, first gas-filled means having a state of nonconductivity and a state of conductivity, second gas-filled means having a state of non-conductivity and a state of conductivity, means for providing an alternating voltage, means responsive to the alternating voltage for converting the alternating voltage into a proportionate direct voltage, means responsive to the direct voltage and coupled to the first and second gas-filled means for biasing the first and second gas-filled means to the state of non-conductivity, means including an amplifier responsive to the direct voltage and coupled to the first and second gas-filled means for producing the state of conductivity in the first gas-filled means upon the introduction of a potential greater than a particular value from the amplifier and for producing the state of conductivity in the second gas-filled means upon the introduction of a potential less than a particular value from the amplifier, and servo means connected in electrical circuitry with the first and second gas-filled means and coupled to the alternating voltage means to regulate the alternating voltage in accordance with the conductivity of the first and second gas-filled means.

2. In combination, first switching means having first and second states of operation and normally biased to the first state of operation for triggering to the second state of operation upon the introduction to the switching means of a direct potential greater than a particular value, second switching means having first and second states of operation and normally biased to the first state of operation for triggering to the second state of operation upon the introduction to the switching means of a direct potential less than a particular value, means for providing an alternating potential, servo means responsive to the operation of the first and second switching means in the second state of operation for respectively decreasing and increasing the alternating potential to regulate the potential, and means including a filter coupled to the alternating potential means and including an amplifier coupled to the filter for introducing to the first and second switching means a direct potential proportionate to the alternating potential to control the operation of the first and second switching means.

3. In combination, first gas-filled means having a cathode, a grid and a plate, second gas-filled means having a cathode, a grid and a plate, means for providing an alternating voltage, means responsive to the alternating voltage for converting the alternating voltage into a proportionate direct voltage, means responsive to the direct voltage for applying a potential between the grid and the cathode of the first gas-filled means and between the grid and the cathode of the second gas-filled means to bias the first and second gas-filled means against conductivity, means including amplifier means responsive to the direct voltage for introducing the voltage from the amplifier means between the grid and cathode of the first gas-filled means to obtain the conductivity of the first gas-filled means for voltages greater than a particular value and for introducing the voltage from the amplifier means between the grid and cathode of the second gas-filled means to obtain the conductivity of the second gas-filled means for voltages less than a particular value, means coupled to the alternating voltage means for applying the alternating voltage to the plates of the first and second gas-filled means in opposite phases, and means including servo means responsive to the states of conductivity of the first and second gas-filled means for varying the alternating voltage in accordance with the states of conductivity of the first and second gas-filled means.

4. In combination, means for providing an alternating voltage, means including an arm coupled to the voltage means and movable to vary the alternating voltage from the voltage means, means including an amplifier and including first switching means responsive to the voltage from the voltage means for producing a closure of the first switching means upon a variation of the voltage in a first direction from a particular value, means including the amplifier and including second switching means responsive to the voltage from the voltage means for producing a closure of the second switching means upon a variation of the voltage from the particular value in a second direction opposite to the first direction, and means including servo means operatively coupled to the movable arm and responsive to the closure of the first and second switching means for varying the position of the movable arm in accordance with such closures said servo means including a first control winding connected in a circuit with the first switching means to become energized upon a closure of the first switching means and coupled to the movable arm to drive the movable arm in a first direction and in which the servo means includes a second control winding connected in a circuit with the second switching means to become energized upon a closure of the second switching means and coupled to the movable arm to drive the movable arm in a second direction opposite to the first direction, the first and second switching means being respectively first and second thyratron tubes biased to a state of nonconductivity and triggered to states of conductivity in accordance with the variations from the particular value of the voltage from the voltage means.

5. In combination for use with means for providing an alternating voltage and with means responsive to the alternating voltage for converting the alternating voltage into a proportionate direct voltage and with servo means coupled to the alternating voltage means to regulate the alternating voltage, first gas-filled means having a state of conductivity and a state of non-conductivity, second gas-filled means having a state of conductivity and a state of non-conductivity, means responsive to the direct voltage and coupled to the first and second gas-filled means for biasing the first and second gas-filled means to the states of non-conductivity, means including an amplifier responsive to the direct voltage and coupled to the first and second gas-filled means for producing the state of conductivity in the first gas-filled means upon the introduction of a potential greater than a particular value from the amplifier and for producing the state of conductivity in the second gas-filled means upon the introduction of a potential less than the particular value from the amplifier, and means connected in electrical circuitry with the first and second gas-filled means and the servo means for introducing signals from the first and second gas-filled means to the servo means in accordance with the states of conductivity and non-conductivity in the first and second gas-filled means to obtain a regulation of the alternating voltage from the alternating voltage means.

6. In combination for use with means for providing an alternating potential and with means responsive to the alternating potential to produce a direct potential proportionate to the alternating potential and with servo means for varying the alternating potential to regulate the alternating potential, first switching means having first and second states of operation and normally biased to the first state of operation for triggering to the second state of operation upon the introduction to the switching means to a direct potential greater than a particular value, second switching means having first and second states of operation and normally biased to the first state of operation for triggering to the second state of operation upon the introduction to the switching means of a direct potential less than a particular value, and means responsive to the operation of the first and second switching means in the second state of operation for introducing signals to the servo means to obtain a regulation of the alternating potential by the servo means.

7. In combination for use with means for providing an alternating voltage and with means responsive to the alternating voltage for converting the alternating voltage into a proportionate direct voltage and with servo means coupled to the alternating voltage means for varying the alternating voltage to regulate the alternating voltage, first gas-filled means having a cathode, a grid and a plate, second gas-filled means having a cathode, a grid and a plate, means responsive to the direct voltage for applying a potential between the grid and the cathode of the first gas-filled means and between the grid and the cathode of the second gas-filled means to bias the first and second gas-filled means against conductivity, amplifier means responsive to the direct voltage for introducing a voltage dependent upon the direct voltage between the grid and cathode of the first gas-filled means to obtain the conductivity of the first gas-filled means for direct voltages greater than a particular value and for introducing the voltage from the amplifier means between the grid and cathode of the second gas-filled means to obtain the conductivity of the second gas-filled means for direct voltages less than a particular value, and means coupled to the alternating voltage means for applying the alternating voltage to the plates of the first and second gas-filled means in opposite phases and for applying signals to the servo means in accordance with the states of conductivity of the first and second gas-filled means to obtain a controlled operation of the servo means in regulating the alternating voltage.

8. In combination for use with means for providing an alternating voltage and with means including an arm coupled to the voltage means and movable to vary the alternating voltage from the voltage means and with servo means operatively coupled to the movable arm for varying the position of the movable arm, means including an amplifier and including first switching means responsive to the voltage from the voltage means for producing a closure of the first switching means upon a variation of the voltage in a first direction from a particular value, means including the amplifier and including second switching means responsive to the voltage from the voltage means for producing a closure of the second switching means upon a variation of the voltage from the particular value in a second direction opposite to the first direction, and means responsive to the closure of the first and second switching means for introducing signals to the servo means to control the operation of the servo means in moving the movable said first and second switching means are respectively first and second thyratron tubes biased to a state of non-conductivity and triggered to states of conductivity in accordance with the variations from the particular value of the voltage from the voltage means.

9. In combination for use with means for providing an alternating voltage and with means including an arm coupled to the voltage means and movable to vary the alternating voltage from the voltage means and with servo means operatively coupled to the movable arm for varying the position of the movable arm, means including an amplifier and including first switching means responsive to the voltage from the voltage means for producing a closure of the first switching means upon a variation of the voltage in a first direction from a particular value, means including the amplifier and including second switching means responsive to the voltage from the voltage means for producing a closure of the second switching means upon a variation of the voltage from the particular value in a second direction opposite to the first direction, and means responsive to the closure of the first and second switching means for introducing signals to the servo means to control the operation of the servo means in moving the movable arm said first and second switching means are respectively first and second thyratron tubes biased to a state of non-conductivity and triggered to states of conductivity in accordance with the variations from the particular value of the voltage from the voltage means, and in which the servo means include a first control winding connected in a circuit with the first switching means to become energized upon a closure of the first switching means and coupled to the movable arm to drive the movable arm in a first direction and in which the servo means includes a second control winding connected in a circuit with the second switching means to become energized upon a closure of the second switching means and coupled to the movable arm to drive the movable arm in a second direction opposite to the first direction.

References Cited in the file of this patent

UNITED STATES PATENTS

| | | |
|---|---|---|
| 2,239,768 | Artzt | Apr. 29, 1941 |
| 2,504,017 | George et al. | Apr. 11, 1950 |
| 2,913,657 | Erickson | Nov. 17, 1959 |

OTHER REFERENCES

Sinsheirmer Abstract of Serial No. 644,974, published April 29, 1952, 657 O.G. 1583.